United States Patent
Rogers

(10) Patent No.: US 6,397,214 B1
(45) Date of Patent: May 28, 2002

(54) METHOD AND APPARATUS FOR INSTANTIATING RECORDS WITH MISSING DATA

(75) Inventor: James P. Rogers, Eden Prairie, MN (US)

(73) Assignee: Computer Associates Think, Inc., Islandia, NY (US)

( * ) Notice: Subject to any disclaimer, the term of this patent is extended or adjusted under 35 U.S.C. 154(b) by 0 days.

(21) Appl. No.: 09/185,357

(22) Filed: Nov. 3, 1998

(51) Int. Cl.⁷ .............................................. G06F 17/30
(52) U.S. Cl. ................................... 707/6; 707/1; 707/5
(58) Field of Search .................................... 707/6, 5, 1

(56) References Cited

U.S. PATENT DOCUMENTS

| | | | | |
|---|---|---|---|---|
| 5,765,147 A | * | 6/1998 | Mattos et al. ................. | 707/4 |
| 5,799,300 A | * | 8/1998 | Agrawal et al. ................ | 707/5 |
| 6,092,065 A | * | 7/2000 | Floratos et al. ................ | 707/6 |
| 6,138,117 A | * | 10/2000 | Bayardo ........................ | 707/6 |

* cited by examiner

Primary Examiner—Diane D. Mizrahi
(74) Attorney, Agent, or Firm—Piper Rudnick, LLP

(57) ABSTRACT

A method of joining two or more sets of data is provided wherein certain dimensions in the fact data are designated as being forced dimensions, and wherein for each forced dimension, a set of entries is created in the fact data each with the same key values in all of the dimensions other than the forced dimension, and each with a different member of the set of values existing in the fact data for that dimension, if and only if at least one entry exists in the fact data with the same set of key values in the dimensions other than the forced dimension.

8 Claims, 8 Drawing Sheets

| Region |
|---|
| West |
| East |
| Central |

| Product | Price |
|---|---|
| DC Motor | $20 |
| AC Motor | $300 |
| Dynamo | $375 |
| Stepper Motor | $42 |

| Client Class |
|---|
| Individual |
| Company |

| Quarter |
|---|
| 1 |
| 2 |
| 3 |
| 4 |

| Department | Name |
|---|---|
| Accounting | John Smith |
| Accounting | Mary White |
| Sales | Pete Sellers |
| Personnel | Jane Yates |

| Name | Phone |
|---|---|
| John Smith | 1532 |
| John Smith | 1533 |
| Mary White | 1570 |
| Pete Sellers | 1623 |
| Jim Black | 1724 |

FIG.1A

| Department | Name | Phone |
|---|---|---|
| Accounting | John Smith | 1532 |
| Accounting | John Smith | 1533 |
| Accounting | Mary White | 1570 |
| Sales | Pete Seller | 1623 |
| Personnel | Jane Yates | |

FIG.1B

| Department | Name | Phone |
|---|---|---|
| Accounting | John Smith | 1532 |
| Accounting | John Smith | 1533 |
| Accounting | Mary White | 1570 |
| Sales | Pete Seller | 1623 |
| | Jim Black | 1724 |

FIG.1C

| Department | Name | Phone |
|---|---|---|
| Accounting | John Smith | 1532 |
| Accounting | John Smith | 1533 |
| Accounting | Mary White | 1570 |
| Sales | Pete Seller | 1623 |
| Personnel | Jane Yates | |
| | Jim Black | 1724 |

FIG.1D

| Brand | Period | Sales |
|---|---|---|
| A | Jan-97 | 10 |
| A | Feb-97 | 20 |
| A | May-97 | 30 |
| A | Jan-98 | 40 |
| A | Feb-98 | 50 |
| A | Mar-98 | 60 |
| A | Apr-98 | 70 |
| A | Jun-98 | 90 |
| B | Feb-97 | 100 |
| B | Mar-97 | 110 |
| B | Jan-98 | 120 |
| B | Feb-98 | 130 |
| C | Apr-97 | 140 |
| C | May-97 | 150 |
| C | Jun-97 | 160 |
| C | Mar-98 | 190 |
| C | Apr-98 | 200 |

FIG.2

| Brand | Period | Sales 97 | Sales 98 |
|---|---|---|---|
| A | Jan | 10 | 40 |
| A | Feb | 20 | 50 |
| A | Mar |  | 60 |
| A | Apr |  | 70 |
| A | May | 30 |  |
| A | Jun |  | 90 |
| B | Jan |  | 120 |
| B | Feb | 100 | 130 |
| B | Mar | 110 |  |
| C | Mar |  | 190 |
| C | Apr | 140 | 200 |
| C | May | 150 |  |
| C | Jun | 160 |  |

FIG.3

| Quarter | Region | Product | Customer Class | Sales |
|---|---|---|---|---|
| 1 | West | DC Motor | Individual | 4 |
| 1 | East | DC Motor | Company | 6 |
| 1 | East | AC Motor | Company | 32 |
| 1 | Central | AC Motor | Company | 4 |
| 2 | East | DC Motor | Individual | 10 |
| 2 | Central | Dynamo | Company | 8 |
| 2 | East | Dynamo | Company | 15 |
| 3 | West | AC Motor | Company | 2 |
| 3 | Central | AC Motor | Individual | 10 |
| 3 | West | DC Motor | Individual | 6 |
| 4 | West | AC Motor | Company | 9 |
| 4 | Central | AC Motor | Company | 7 |
| 4 | Central | Dynamo | Company | 20 |
| 4 | East | Dynamo | Company | 16 |

FIG.5

| Quarter | Region |
|---|---|
| 1 | West |
| 1 | East |
| 1 | Central |
| 2 | East |
| 2 | Central |
| 2 | East |
| 3 | Central |
| 3 | West |
| 4 | West |
| 4 | Central |
| 4 | East |

FIG.6

| Iteration | (Dim. 1) | (Dim. 2) | (Dim. 3) | (Dim. 4) |
|---|---|---|---|---|
| 1 | 1 | 1 | 1 | 1 |
| 2 | 1 | 1 | 1 | 2 |
| 3 | 1 | 1 | 2 | 1 |
| 4 | 1 | 1 | 2 | 2 |
| 5 | 1 | 1 | 3 | 1 |
| 6 | 1 | 1 | 3 | 2 |

| Iteration | Quarter | Region | (Dim. 3) | (Dim. 4) |
|---|---|---|---|---|
| 1 | 1 | West | DC Motor | Individual |
| 2 | 1 | West | DC Motor | Company |
| 3 | 1 | West | AC Motor | Individual |
| 4 | 1 | West | AC Motor | Company |
| 5 | 1 | West | Dynamo | Individual |
| 6 | 1 | West | Dynamo | Company |

| Quarter | Region | Product | Client Class | Sales |
|---|---|---|---|---|
| 1 | West | DC Motor | Individual | 4 |
| 1 | East | DC Motor | Company | 6 |
| 1 | East | AC Motor | Company | 32 |
| 1 | Central | AC Motor | Company | 4 |
| 2 | East | AC Motor | Company | 5 |
| 2 | East | DC Motor | Individual | 10 |
| 2 | East | Dynamo | Company | 8 |
| 2 | Central | Dynamo | Company | 15 |
| 3 | West | AC Motor | Company | 2 |
| 3 | Central | AC Motor | Individual | 10 |
| 3 | West | DC Motor | Individual | 6 |
| 4 | West | AC Motor | Company | 9 |
| 4 | Central | AC Motor | Company | 7 |
| 4 | Central | Dynamo | Company | 20 |
| 4 | East | Dynamo | Company | 16 |
| 1 | West | DC Motor | Company | 0 |
| 1 | West | AC Motor | Individual | 0 |
| 1 | West | AC Motor | Company | 0 |
| 1 | West | Dynamo | Individual | 0 |
| 1 | West | Dynamo | Company | 0 |
| 1 | East | DC Motor | Individual | 0 |
| 1 | East | AC Motor | Individual | 0 |
| 1 | East | AC Motor | Company | 0 |
| 1 | East | Dynamo | Individual | 0 |
| 1 | East | Dynamo | Company | 0 |
| 1 | Central | DC Motor | Individual | 0 |
| 1 | Central | DC Motor | Company | 0 |
| 1 | Central | AC Motor | Individual | 0 |
| 1 | Central | Dynamo | Individual | 0 |
| 1 | Central | Dynamo | Company | 0 |

FIG.9A

| | | | | |
|---|---|---|---|---|
| 2 | East | DC Motor | Company | 0 |
| 2 | East | AC Motor | Individual | 0 |
| 2 | East | Dynamo | Individual | 0 |
| 2 | Central | DC Motor | Individual | 0 |
| 2 | Central | DC Motor | Company | 0 |
| 2 | Central | AC Motor | Individual | 0 |
| 2 | Central | AC Motor | Company | 0 |
| 2 | Central | Dynamo | Individual | 0 |
| 3 | West | DC Motor | Company | 0 |
| 3 | West | AC Motor | Individual | 0 |
| 3 | West | Dynamo | Individual | 0 |
| 3 | West | Dynamo | Company | 0 |
| 3 | Central | DC Motor | Individual | 0 |
| 3 | Central | DC Motor | Company | 0 |
| 3 | Central | AC Motor | Company | 0 |
| 3 | Central | Dynamo | Individual | 0 |
| 3 | Central | Dynamo | Company | 0 |
| 4 | West | DC Motor | Individual | 0 |
| 4 | West | DC Motor | Company | 0 |
| 4 | West | AC Motor | Individual | 0 |
| 4 | West | Dynamo | Individual | 0 |
| 4 | West | Dynamo | Company | 0 |
| 4 | East | DC Motor | Individual | 0 |
| 4 | East | DC Motor | Company | 0 |
| 4 | East | AC Motor | Individual | 0 |
| 4 | East | AC Motor | Company | 0 |
| 4 | East | Dynamo | Individual | 0 |
| 4 | Central | DC Motor | Individual | 0 |
| 4 | Central | DC Motor | Company | 0 |
| 4 | Central | AC Motor | Individual | 0 |
| 4 | Central | Dynamo | Individual | 0 |

FIG.9B

| Brand | Period | Sales |
|-------|--------|-------|
| A | Jan-98 | 40 |
| A | Feb-98 | 50 |
| A | Mar-98 | 60 |
| A | Apr-98 | 70 |
| A | May-98 | 0 |
| A | Jun-98 | 90 |
| B | Jan-98 | 120 |
| B | Feb-98 | 130 |
| B | Mar-98 | 0 |
| C | Mar-98 | 190 |
| C | Apr-98 | 200 |
| C | May-98 | 0 |
| C | Jun-98 | 0 |

METHOD AND APPARATUS FOR INSTANTIATING RECORDS WITH MISSING DATA

BACKGROUND OF THE INVENTION

The present invention relates to querying data in a database and more specifically to a method of generating data in a table for comparison between data entries.

When performing queries on a database, especially in the field of trend analysis, data from multiple tables is frequently joined together in what is referred to as an outer join. There are three types of outer join: a left outer join, a right outer join and a full outer join.

A left outerjoin between two relations is an outerjoin where only the left relation is listed in its entirety. The right relation is listed only where it matches the left in the joined fields. For example, the left join of the relations shown in FIG. 1A is shown in FIG. 1B. There is no record for Jim Black.

A right outer join between two relations is an outer join where only the right relation is listed in its entirety. The left relation is listed only where it matches the right relation in the joined fields. The right join of the relations shown in FIG. 1A is shown in FIG. 1C. Jane Yates does not appear in this table.

A full outer join between two relations is a union of a left outer join and a right outer join, and includes all the tuples (records in a relation table) from both relations regardless of whether both relations have data in the dimension being joined. The full outer join of the two relations shown in FIG. 1A is shown in FIG. 1D. All the names are present in this table.

A cross product of two or more sets of data provides a record for every combination of all the records in each of the sets of data. The number of records in a cross product is therefore the product of the number of records in each data set, and can get very large.

Data is stored in a database in a set of dimension tables and fact tables. Dimension tables contain records representing a set of entities with similar characteristics. Each record has one or more values representing different attributes of the entity in question. One of these attributes, or a combination of the attributes, uniquely identify each record in the dimension, and is referred to as the key.

Fact data tables pro-vide all the actual data which has been accumulated. One or more of the columns in a fact table will be dimension columns, and each such column will usually represent a single dimension. Entries in a dimension column (or columns) associated with a specific dimension will represent the key value in that dimension the fact entry is associated with. The fact tables also contain columns with the actual data associated with the fact entry. For example, in the fact data table of FIG. 2, the three dimensions are year, quarter and product. The single measure in this table is Sales.

Frequently, it is required to compare data for entries in one or more dimensions, against equivalent data in other dimensions. For example, it might be desired to compare two sets of sales records stored in a database over two or more periods, although the data for the two periods could be stored in any number of fact tables which will need to be combined. FIG. 2 shows an example of such a set of data. The two dimensions on which the join will take place are months and products. It is often impractical to store a record in a fact table for every combination of each dimension, regardless of whether or not there is corresponding data for such entries, as this would take up a huge amount of space. Accordingly, databases usually only store fact data for dimension entries where data actually exists. In this example, entries are only stored for product sales if any of the product were actually sold in the respective month. Data entries therefore do not exist in the fact data if a particular product was not yet on sale during a certain period, or if it had been discontinued.

If the two sets of time periods to be compared are split into separate tables and a fall outer join is performed on the two sets of tables matching on the product and time dimensions, the joined table will contain entries for all date and product records in either of the tables, as shown in FIG. 3. A product will only be represented in the output table for months in which the product was sold in one of the two years. However, it is often desirable to have an entry for each product for every month so that data can be more easily compared.

The same can be true of any dimension, not just a period dimension. Often, when an entry exists for one entity in a dimension in a fact table, corresponding entries for other entities in the dimension might be desirable for comparison, regardless of whether there is corresponding data for those entities.

Furthermore, it is often desirable to analyze data on a different computer on a network from the computer on which the data is stored, and therefore it is critical that a minimal quantity of data is transmitted from the database to create the table. A method of performing a join is needed such that minimal amounts of data are transmitted across the network.

SUMMARY OF THE INVENTION

The present invention provides a method of forcing equivalent empty entries for all requested entities in certain preselected dimensions of fact data into an expanded fact table if there is a data entry for one of those selected entities so that the data entries can be easily compared across all the selected entities.

The present invention further provides a method of extracting certain data from predetermined records

BRIEF DESCRIPTION OF THE DRAWINGS

FIG. 1A shows two relation tables by way of example.

FIG. 1B shows the left outer join of the relations shown in FIG. 1A.

FIG. 1C shows the right outer join of the relations shown in FIG. 1A.

FIG. 1D shows the full outer join of the relations shown in FIG. 1A.

FIG. 2 shows fact table data for months in two successive years by way of example.

FIG. 3 shows the full outer join of data in the table shown in FIG. 2.

FIG. 5 shows raw data returned from an initial request on the data shown in FIG. 4.

FIG. 6 shows indexes obtained from the fact data in FIG. 5.

FIG. 9 shows the result of the algorithm of the first embodiment of the invention when applied to the data in the table of FIG. 4.

DETAILED DESCRIPTION

Figures 4A, 4B:
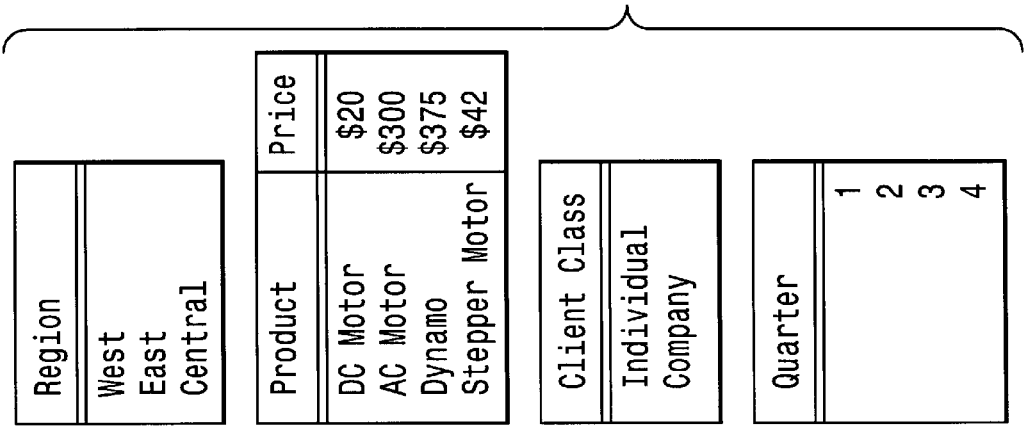
FIG. 4A is a fact data table by which the method of a first embodiment of the invention is exemplified.
FIG. 4B shows the dimensions associated with the fact data table shown in FIG. 4A.

A first embodiment of the invention is hereinafter described with reference to FIGS. 4–10. FIG. 4A shows a table of fact data on which the present invention might be used containing the four dimensions quarter, region, product, and customer class, and a sales measure. The dimensions are shown in FIG. 4B. A method is provided for "forcing" all entries in preselected dimensions to be present in the output data retrieved from a database.

A request specifies which entries in which dimensions are to be retrieved from the fact data, and which dimensions are to be forced. In the example given, the request would specify the following entries from the following dimensions:

| Periods: | All quarters | |
| Products: | AC Motor, DC Motor, Dynamo | FORCED |
| Regions: | East, West, Central | |
| Customer Class: | Individual, Company | FORCED |

It is permissible for no dimensions to be forced, in which case all records will be retrieved from the data tables which match the data request criteria. It is also permissible for all dimensions to be "forced", in which case all combinations of requested entries from all dimensions will be present in the output table as will become clear.

An administration program allows the database administrator for each dimension to specify whether or not records may be "forced" within that dimension. A client interface displays all of the dimensions available within an analysis. For each dimension so configured within the administration program, it will allow users to select "force selections" from a context menu to AS indicate that they want all selected records to be returned whether or not data actually exists for them.

The request object, which is the mechanism by which a users request is communicated to the server which executes the request, stores for each dimension whether or not the selections within that dimension should be "forced".

The following input parameters also need to be populated in preparation for calling the routine that performs the "force".

1) A pointer to the table that will contain the data resulting from the query.
2) A structure that contains, for each dimension, an array of pointers to the rows within each input fact table ordered by the records in that dimension.
3) A structure that contains tuples each referencing an element from each forced dimension such that the collection of tuples contains references to all records which the user desired to have returned.
4) An array indicating which dimensions should be forced, referred to as the forced dimensions array.

All the fact data meeting the criteria specified in the request is retrieved from the fact table shown in FIG. 4A within the database management system (DBMS). The raw data returned by this request is shown in FIG. 5. It should be noted that a minimum of data is returned from the fact table to satisfy the request, and that no null entries are returned.

The following algorithm is performed on the raw data returned.

An index is created using the columns of the non-forced dimensions in the raw data, as shown in FIG. 6. The following steps are followed for each unique set of tuples in this index.

Figures 7, 8A, 8B:
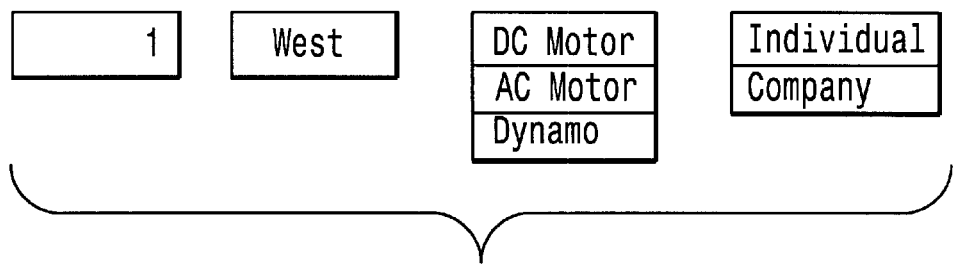
FIG. 7 shows a set of search arrays associated with the first entry of the table shown in FIG. 5.
FIG. 8A shows the values of a set of search array pointers for each iteration over the search arrays shown in FIG. 7.
FIG. 8B shows the search target tuples generated by the search arrays shown in FIG. 7 using the pointers shown in FIG. 8A.

A) A set of arrays is created, one for each dimension, as shown in FIG. 8A. The arrays for the non-forced dimensions have a single entry, and the arrays for the forced dimensions have entries for every SearchValue for the column, as shown in FIG. 8B for the first tuple in the index.

B) A key value index array is set up that contains the current position in each search key's value index. The values in this array for each of the iterations fr the particular set of index values is shown in FIG. 8A.

C) A key values tuple is set up with the keys from the search array (shown in FIG. 7) corresponding to the values in the key value index array. The search tuples which would be generated for each of the key combinations shown in FIG. 8A are shown in FIG. 8B.

D) A search procedure, as described below, is carried out for each combination of key values from the search arrays, by incrementing the values in the rightmost key value column until the last value is reached. When this value is reached, the value in the rightmost column is reset to the first value, and the value in the next column leftwards is increased by one. When this column reaches its last value, it is reset, and the next column leftwards is increased by one. This iterating process continues until all columns have reached their last value, generating all the entries shown in FIGS. 8A and 8B. The number of iterations will be the product of the number of search values in each column, and will provide every combination of the requested forced key values. In this example, there will be 1*1*3*2=6 iterations. The search procedure for each iteration is as follows:

1) Look for the search target defined by the current key values in the indexed fact table.
2) If the search target doesn't appear, add it to the fact table, with appropriate null measures, and mark it as forced.

The fact table which results from this procedure in the current case is shown in FIG. 9. Note, there are no entries for the second quarter in the west region or the third quarter in the east region because there were no entries for these records in the original fact data, and these dimensions are not being forced. This data can then be easily output to a graphical format for comparison of entries.

Figures 10, 11:
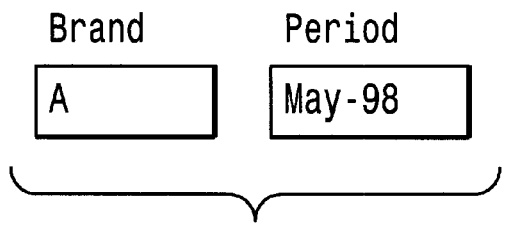
FIG. 10 shows the search arrays for the first index entry generated from the example data of the FIG. 2 in accordance with the second embodiment of the invention.
FIG. 11 shows the results of the operation of an example of the second embodiment of the invention on the data shown in FIG. 2.

A second embodiment is now described with reference to FIGS. 2, 10 and 11. According to this embodiment, another type of force is implemented for time dimensions, which can be combined with full force operations in other dimensions (including other time dimensions if appropriate). The administrator may choose which dimensions can be forced in this way in the same way she can choose which dimensions can be forced.

If a user requests to compare data in one period with data in another period, all the data from both periods is first obtained. It should be noted that these periods might overlap, for example if comparison is requested to the previous month over a whole year. An example set of data which might be returned if the following set of data is requested is shown in FIG. 2:

Periods: January–June 1998

Brands: A, B, C and D

Measures: Sales

Comparison: Prior Year

The force procedure used is similar to the procedure used in the first embodiment. The time dimension being compared is treated as a non-forced dimension. Therefore, for the search arrays created for each unique entry in the raw data and shown in FIG. 10, a single entry is entered into the search array for the period. However, if the time entry in question is a member of the comparison set of values (in this case the entries from 1997), the current equivalent entry is placed in the search array entry in question instead of the comparison entry. For this example, that would mean putting the equivalent 1998 month in the month search array cell rather than the 1997 month. However if the in the month in question was a 1998 month, the actual 1998 month would be put in the search array.

If an entry could be both a comparison and a current entry because the date ranges overlap, then the entry is treated as a comparison entry. This has the equivalent effect to performing the iteration twice, once as a comparison entry and once as a current entry.

All the requested entries for the other dimensions are then forced into the result set for the current period associated with that member of the period dimension. Entries left over from the raw data in the comparison period are then removed from the data table. The resulting data set in this case is shown in FIG. 11. All entries which would have been present in the same query carried out on the previous period will be returned so that the data can easily be compared to the data from the previous period.

It should be noted that the measures from fact data entries from the comparison period only are not utilized in generating the data according to this embodiment, and that data therefore need not be returned by the first request producing the raw results if this causes significant data transfer savings.

However, if the measures from the previous period data is to be joined with the data returned by this query, it will be more efficient to request all the data from both requested periods in one operation, perform the operation of the invention to create tables for both periods and then join the tables for comparison.

According to a third embodiment, the method discussed with reference to the first and second embodiments is carried out on an application server connected via a network link to the server the database is stored in. The application server can be configured to efficiently perform the operations of the algorithms described above, while the database server can be optimized for quick retrieval of records. Using this configuration, it is therefore important that a minimum of data is transferred across the network from the database server to the application server. Using the algorithms discussed for the first and second embodiments of the invention, only the actual fact data records stored need to be transferred from the database server to the application server, along with the dimension key values. This is far more efficient than performing the operation of the invention on the database server, and then transferring the joined database tables to the application server, as a significant number of empty data entries would then have to be transferred across the network.

While preferred embodiments of the present invention have been illustrated and described, it will be understood by those of ordinary skill in the art that changes and modifications can be made without departure from the invention in its broader aspects. Various features of the present invention are set forth in the following claims.

What is claimed is:

1. A method of retrieving fact data in a fact data table in a data warehouse, wherein each fact data entry in the fact data table comprises entries from each of a plurality of dimensions, the method comprising:

a) selecting a set of entries in each dimension, retrieving all entries in the fact data table for which an entry in each dimension is a member of a corresponding set and placing the retrieved entries in a preliminary fact data table;

b) selecting at least one dimension in which corresponding entries from the selected set of dimension entries are to be forced to be present in an output fact table if one entry from the selected set of dimension entries is present in the preliminary fact data table;

c) for each set of non-forced dimension values appearing in the preliminary fact data table, iterating through every combination of dimension values from dimension data sets of the forced dimensions, and for each iteration:

i) searching through records in the preliminary fact data table for a record with forced and non-forced key values associated with the current iteration; and ii) adding an entry to the preliminary fact data table with the non-forced and forced key values associated with the current iteration if not found in the search; and d) outputting an appended preliminary fact data table as the output fact table.

2. A method of retrieving fact data in a fact data table in a data warehouse, wherein each fact data entry in the fact data table comprises entries from each of a plurality of dimensions, and wherein one of said dimensions comprises time related entities, the method comprising:

a) selecting a set of entries in each dimension, each selected set of entries in a time related dimension comprising a set of required entries and a set of corresponding comparison entries; retrieving all entries in the fact data table for which an entry in each dimension is a member of the corresponding set and placing the retrieved entries in a preliminary fact data table;

b) selecting at least one dimension in which corresponding entries from the selected set of dimension entries are to be forced to be present in an output fact table if one entry from said selected set of dimension entries is present in the preliminary fact data table, said at least one dimension whose entries are to be forced includes said time related dimension;

c) for each set of non-forced dimension values appearing in the preliminary fact data table, iterating through each of a set of values in the time related dimension for each fact data table entry associated with a set of non-forced dimension values, replacing any comparison values with equivalent required values, and iterating through every combination of dimension values from selected dimension data entries of the at least one forced dimension other than the time related dimension, and for each iteration:
  i) searching through records in the preliminary fact data table for a record with forced and non-forced key values associated with the current iteration; and
  ii) adding an entry to the preliminary fact data table with the non-forced and forced key values associated with the current iteration if not found in the search; and
d) outputting an appended preliminary fact data table as the output fact table.

3. A method in accordance with claim 2, wherein at least one of said comparison entries and at least one of said required entries are the same dimension entry.

4. A method in accordance with claim 1, wherein iteration through all the combinations of forced dimension entries comprises iterating through a set of nested loops, each loop being associated with a forced dimension, and each pass around each loop selecting a different entry from the selected set of entries in the associated dimension.

5. Apparatus for retrieving fact data in a fact data table in a data warehouse, wherein each fact data entry in the fact data table comprises entries from each of a plurality of dimensions, said apparatus comprising a processor for executing computer readable instructions to:
  a) retrieve all entries in the fact data table for which an entry in each dimension is a member of a selected set of entries in each dimension, and place the retrieved entries in a preliminary fact data table; wherein at least one of said dimensions is selected to be a forced dimension such that corresponding entries from the selected set of dimension entries are to be forced to be present in an output fact table if one entry from the selected set of dimension entries is present in the preliminary fact data table;
  b) generate a set of non-forced dimension values appearing in the preliminary fact data table, iterate through every combination of dimension values from dimension data sets of the at least one forced dimension with each set of the non-forced dimension values,
    i) search through records in the preliminary fact data table for a record with forced and non-forced key values associated with each iteration,
    ii) add an entry to the preliminary fact data table with the non-forced and forced key values associated with the current iteration if not found in the search; and
  c) output an appended preliminary fact data table as the output fact table.

6. Apparatus according to claim 5, wherein one of said dimensions comprises time related entities, wherein entries in a time related dimension are selected from a set of required entries and a set of corresponding comparison entries, and wherein the processor further executes computer readable instructions to:
  iterate through each of a set of values in the time related dimension for each fact data table entry associated with the set of non-forced dimension values, replace any comparison values with equivalent required values, and iterate through every combination of dimension values from selected dimension data entries of the at least one forced dimension other than the time related dimension.

7. A method of retrieving fact data in a fact data table in a data warehouse, wherein each fact data entry in the fact data table comprises entries from each of a plurality of dimensions, the method comprising:

a) selecting a set of entries in each dimension, retrieving all entries in the fact data table for which an entry in each dimension is a member of a corresponding set of comparison entries and placing the retrieved entries in a preliminary fact data table;
b) selecting at least one dimension in which corresponding entries from the selected set of dimension entries are to be forced to be present in an output fact table if one entry from the selected set of dimension entries is present in the preliminary fact data table;
c) for each set of non-forced dimension values appearing in the preliminary fact data table, iterating through every combination of dimension values from dimension data sets of the forced dimensions, and for each iteration:
  i) searching through records in the preliminary fact data table for a record with forced and non-forced key values associated with the current iteration; and
  ii) adding an entry to the preliminary fact data table with the non-forced and forced key values associated with the current iteration if not found in the search; and
d) outputting an appended preliminary fact data table as the output fact table.

8. A method of retrieving fact data in a fact data table in a data warehouse, wherein each fact data entry in the fact data table comprises entries from each of a plurality of dimensions, and wherein one of said dimensions comprises time related entities, the method comprising:
a) selecting a set of entries in each dimension, each selected set of entries in a time related dimension comprising a set of required entries and a set of corresponding comparison entries; retrieving all entries in the fact data table for which an entry in each dimension is a member of the set of corresponding comparison entries and placing the retrieved entries in a preliminary fact data table;
b) selecting at least one dimension in which corresponding entries from the selected set of dimension entries are to be forced to be present in an output fact table if one entry from said selected set of dimension entries is present in the preliminary fact data table, said at least one dimension whose entries are to be forced includes said time related dimension;
c) for each set of non-forced dimension values appearing in the preliminary fact data table, iterating through each of a set of values in the time related dimension for each fact data table entry associated with a set of non-forced dimension values, replacing any comparison values with equivalent required values, and iterating through every combination of dimension values from selected dimension data entries of the at least one forced dimension other than the time related dimension, and for each iteration:
  i) searching through records in the preliminary fact data table for a record with forced and non-forced key values associated with the current iteration; and
  ii) adding an entry to the preliminary fact data table with the non-forced and forced key values associated with the current iteration if not found in the search; and
d) outputting an appended preliminary fact data table as the output fact table.

* * * * *